March 24, 1942. J. ROBINSON 2,277,184
AUTOMATIC TRAIN PIPE CONNECTOR
Filed Dec. 27, 1938 2 Sheets-Sheet 2

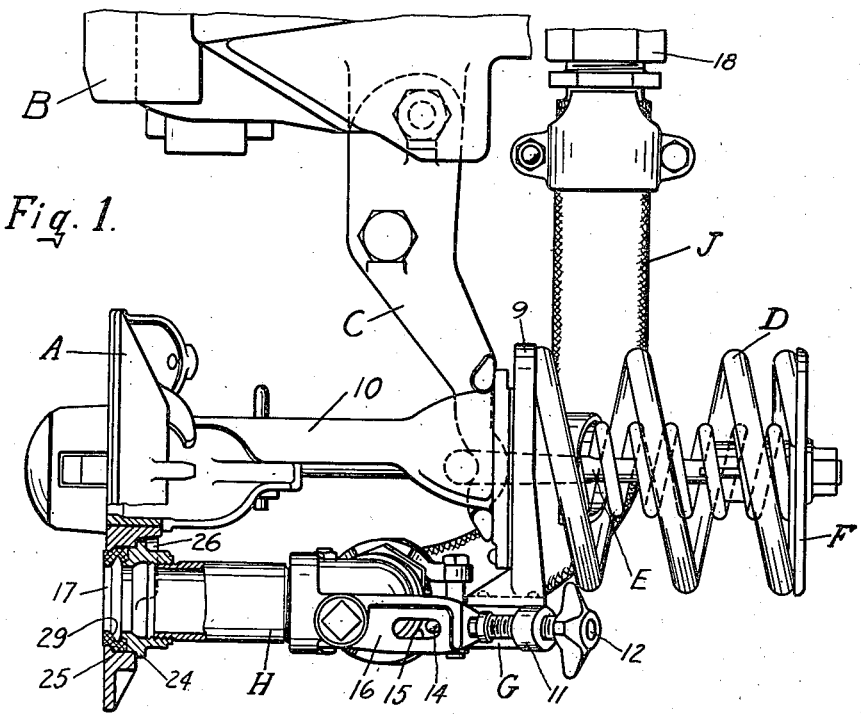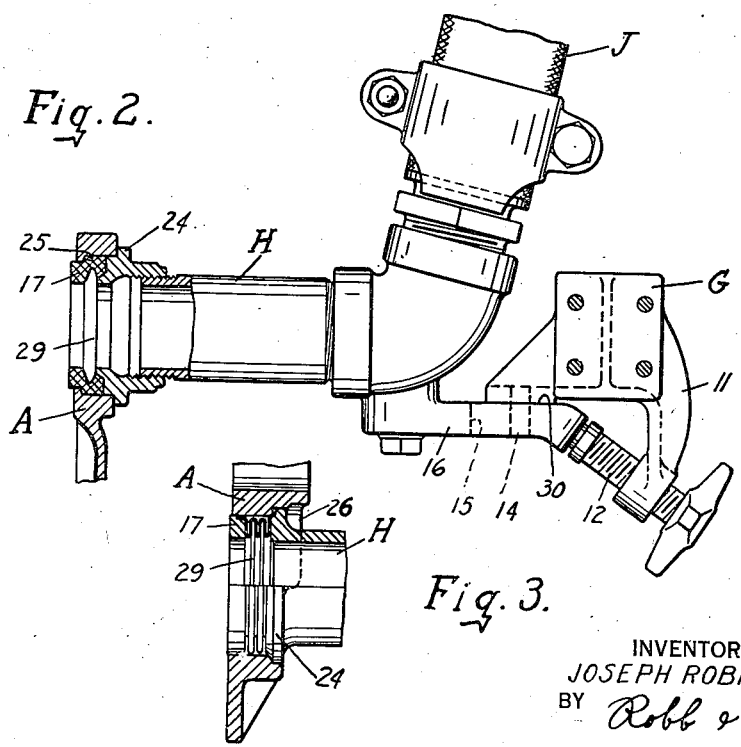

INVENTOR
JOSEPH ROBINSON
BY Robb & Robb
ATTORNEY

Patented Mar. 24, 1942

2,277,184

UNITED STATES PATENT OFFICE 2,277,184

AUTOMATIC TRAIN PIPE CONNECTOR

Joseph Robinson, New York, N. Y., assignor of one-half to Roy M. Wolvin

Application December 27, 1938, Serial No. 247,817

6 Claims. (Cl. 285—58)

This invention relates to interchange devices for automatic train pipe connectors. Among the objects are to simplify and improve such devices, particularly as they are employed to connect the steam hose of an automatic connector into interchange communication with a similar hose of an unequipped car. In carrying out this object I have provided improved means for removing and replacing defective gaskets between coupled connector heads. In the accompanying drawings, in which like reference characters indicate similar parts, Figure 1 is a side elevation of an automatic train pipe connector in non-interchange connection and showing a part of my improvement;

Figure 2 is a plan view of the connector fitting H and the means for removing and replacing the same while mated connector heads remain coupled. This arrangement performs the double function of providing for the replacement of defective gaskets and, in cooperation with the dummy K, of connecting the hose J across to the hose of a car not equipped with the connector;

Figure 3 is a vertical section through the gasket 17 of Figure 1 showing another construction thereof. A gasket very similar to this one is shown in my above copending application;

Figure 4:
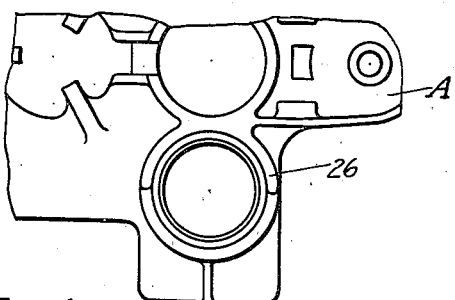
Figure 4 is a rear elevation of the lower part of the connector head A illustrating the guide 26 for the forward end of the fitting H.

The means for yieldingly supporting the coupling head A from the car coupler B is fully described in my United States Letters Patent #2,141,196, granted December 27, 1938, and need not be treated in detail here. Sufficient to say that the head is pivotally mounted on the base C, and forwardly projected, by the buffer spring D and tie rod and plate arrangement E and F. The spring rests against a flange 9, formed integral with or attached to the yoke 10, to which is suitably connected a bracket G having a threaded arm or finger 11 which adjustably receives the screw 12. A suitable lug or pin 14 extends through the slot 15 of the tongue 16 on the rear end of the fitting H and slidingly and pivotally supports the fitting on the bracket G, normally in the horizontal position shown in Figure 1. The forward end of the fitting rests in the coupling head A and against the expansible gasket 17 in supporting relation to the latter. A conventional type of hose J is connected to the curved rear end of the fitting H in any desired manner, the other end of the hose being connected to the train pipe 18, Figure 1, of the car.

Figure 5:
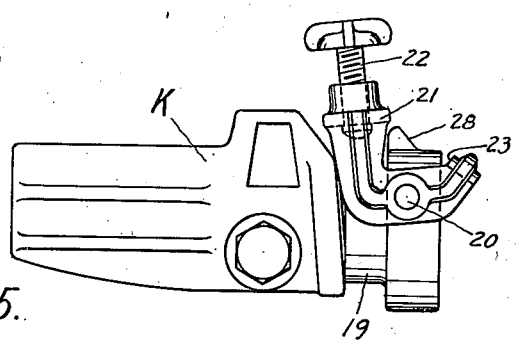
Figure 5 is a side elevation of a conventional type of hand operated steam hose coupling or dummy K with a part of my improved interchange clamp mounted thereon and open.
Figure 6:
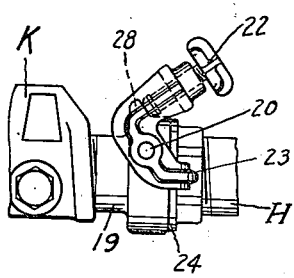
Figure 6 is a side elevation showing the rear end of the interchange dummy with the front end of the fitting H anchored thereto by means of my improved quick operating clamp.
Figure 7:
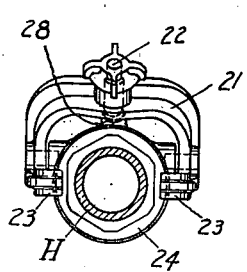
Figure 7 is a rear view of the construction shown in Figure 6.
Figure 8:
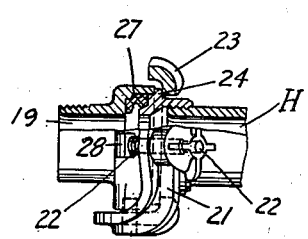
Figure 8 is a sectional plan view showing the fitting H anchored to my improved clamp.
Figure 9:
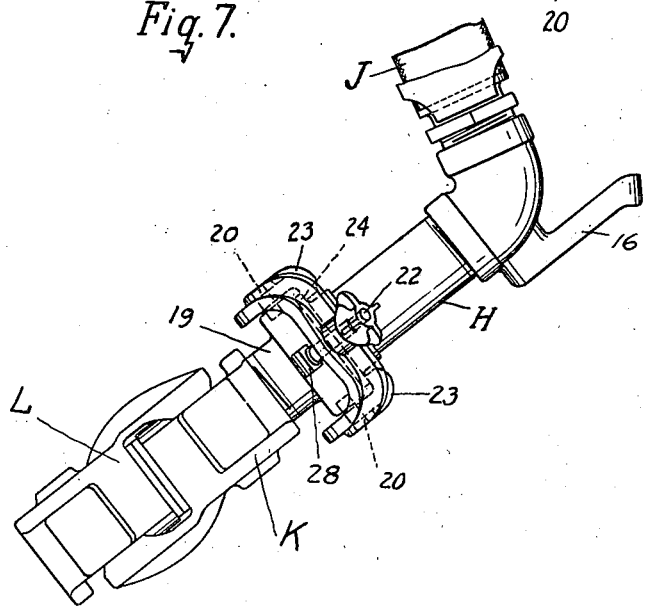
Figure 9 is a plan view of my improved interchange connected to the coupling in the hose of a non-connector equipped car.

My improved interchange dummy includes a conventional hose coupling K, Figure 5, into which is threaded my improved quick operating clamping device. This device comprises the nipple or shank 19 on which is pivotally mounted, by means of the pins 20, the tiltable U shaped dog or clevis 21, the clamping screw 22 being threaded through this clevis at approximately its transverse center. The clevis spans the shank or nipple 19 and its ends terminate in dogs or hooks 23 which engage behind the flange 24 of the fitting H, Figures 6 to 9. Normally the screw 22 is at the limit of its outward movement, Figure 5, which permits the clevis or clamp 21 to be swung or rotated to the full open position shown in that figure. When interchange with a non-connector equipped car is desired, or it is desired to replace a defective gasket 17, the screw 12 in the bracket G, Figure 1, is turned back permitting the fitting H to be moved rearwardly on the pin 14 until the front end of the fitting leaves the coupling head A whereupon the fitting may be removed from the pin 14, swung to one side, or rocked downwardly on the pin. The gasket 17 may then be removed and a new one set in its seat 25 in the head. The parts are returned to the service position shown in Figure 1 by reversing this operation, the overhanging flange or guide 26, formed on the back of the head A, Figure 4, guiding the front end of the fitting H back into place. Or if interchange is desired the gasket 17 may be extracted from the head, while the fitting H is removed therefrom, and set into the shank or nipple 19 of the interchange dummy K, a seat 27, Figure 8, being provided in the shank to receive the gasket 17 from the connector head, or to receive and retain a suitable gasket intended for the shank or nipple 19 only. When the gasket is in place in the shank the front end of the fitting H is then inserted against the gasket, Figures 6 and 8, and the clamp 21 is rocked forward to the service position shown in Figure 6. The screw 22 is then threaded tightly down against the lug or stop 28, Figure 5, on top of the nipple or shank 19, thus powerfully drawing the fitting inwardly against the gasket and making a strong, positive connection that is liquid tight at all times. The gasket being expansible under the pressure of the fluid entering its annular groove or bellows 29, an absolutely tight joint is at all times assured. The dummy, or conventional coupling K may then be connected across into the similar coupling L of the non-connector equipped car, the fitting H having been removed from the pin 14 and being of length to facilitate the connection. Removal of the fitting from the pin 14 is not necessary, as above indicated, when the fitting is backed out of the head A for the purpose only of replacing a worn gasket 17, the pin acting in this case as a pivotal support for the fitting. The machined fit at 30 between the lugs 16 of the fitting H and the bracket G, Figure 2, correctly aligns the fitting horizontally so that the center of the gasket and the center of the fitting are always co-axial when in the service position, Figures 1 and 2.

What I claim is:

1. An interchange device for an automatic train pipe connector comprising, in combination, a fitting removably connected to the connector head and adapted to conduct a fluid thereto, an interchange dummy adapted to connect said fitting into interchange communication with the train pipe hose of a car not equipped with said connector, and manually operated means pivotally mounted on said dummy for removably connecting the dummy to said fitting when the fitting is removed from said head, said means including an anchor member, and a clamping device adapted to rotate the anchor member on its bearing on said dummy to move it against one end of said fitting to clamp the dummy and the fitting together.

2. An interchange device for an automatic train pipe connector comprising, in combination, a fitting removably connected to the connector head and adapted to conduct a fluid thereto, an interchange dummy adapted to connect said fitting into interchange communication with the train pipe hose of a car not equipped with said connector, a gasket arranged in one end of said dummy and adapted to be engaged by said fitting, and manually operated means pivotally mounted on said dummy for removably connecting the dummy to said fitting and against said gasket when the fitting is removed from said head, said means including an anchor member, and a clamping device adapted to rotate the anchor member on its bearing on said dummy against said fitting to draw the fitting inwardly against said gasket and tightly clamp the fitting and said dummy and said gasket together.

3. An interchange device such as described in claim 2 in which the dummy is a conventional hose coupling provided with a shank in which shank said gasket is mounted, distinguished further by the fact that the anchor member is pivoted on said shank and the clamping device is carried by said anchor member and is threadingly adjustable therein the longitudinal direction of said clamping device.

4. An interchange device for an automatic train pipe connector, comprising, in combination, a fitting removably connected to the connector head and adapted to conduct a fluid thereto, said fiting being provided with a seat or shoulder, an interchange dummy adapted to connect said fitting into interchange communication with the train pipe hose of a car not equipped with said connector, said dummy including a shank, and manually operated means on said shank for removably connecting the shank and dummy to said fitting when the fitting is removed from said head, said means including a clevis pivoted on bearings arranged on opposite sides of said shank, the forks of said clevis being provided with inwardly extending dogs adapted to engage said seat, and a clamping device engaging said clevis and adapted to rock the clevis on said bearings to bring said dogs into engagement with said seat or shoulder to clamp said dummy and shank to said fitting.

5. An interchange device such as described in claim 1 in which the fitting is normally positioned horizontally on the connector parallel to the body of the connector whereby to avoid low points in said fitting in which condensation might collect and close the fitting, said fitting being provided on its rear portion with a support which cooperates with manually operated power means arranged on the body of said connector to support the rear end of said fitting and to maintain the fitting in said horizontal position, said manually operated power means serving also to shift the fitting longitudinally of said connector body to remove the fitting from the connector head for connection with said dummy, distinguished further by the provision of a shoulder on said fitting for limiting the longitudinal inward movement of the fitting in the connector head under the influence of said power means and in said dummy under the influence of said clamping device.

6. Gasket retaining means for an automatic train pipe connector, comprising, in combination, a connector head, a support therefor, a gasket mounted in said head, a fitting for conducting a fluid to the head, said fitting having a seat on its front end adapted to bear against said gasket to retain the gasket in place, means on the fitting for cooperating with separate means on said support to support the fitting horizontally and to shift it longitudinally with respect to said support to connect and disconnect the fitting from said head, said means including a pin carried by said support on which pin said fitting slides when the fitting is being removed from or replaced in said head and on which the fitting is adapted to tilt vertically and laterally when disconnected from said head, a thrust screw carried by said support, and a lug on the rear portion of said fitting against which said thrust screw engages to slide the fitting on said pin and to clamp the fitting and said gasket to said connector head.

JOSEPH ROBINSON.